April 27, 1971     G. R. MEYER     3,576,699

PLASTIC BOUQUET HOLDER

Filed July 14, 1969

INVENTOR.
GENE R. MEYER

BY *Polachek & Saulsbury*

ATTORNEYS

United States Patent Office 3,576,699
Patented Apr. 27, 1971

3,576,699
PLASTIC BOUQUET HOLDER
Gene R. Meyer, % Lomey Manufacturing Corp.,
P.O. Box 7, Deer Park, N.Y. 11729
Filed July 14, 1969, Ser. No. 841,233
Int. Cl. A47g 7/00
U.S. Cl. 161—27     4 Claims

ABSTRACT OF THE DISCLOSURE

A plastic bouquet holder formed of a funnel shaped plastic at the outer periphery of which is stitched a lace serving to support the blossom heads while the flower stems are extended downwardly through the funnel and the spout thereof formed of a series of runners or fingers adapted to be entwined with the flower stems so as to provide a better grip of the stems when wound with the holding wire. The outer flange is formed of a series of triangular shaped portions allowing the lace to droop between the portions and thereby cover the flowers spaced peripherally about the holder. The flanges also serve as bumpers to protect the flowers.

---

This invention relates to a plastic bouquet holder.

It is the principal object of the present invention to provide a bouquet holder adapted in fashion to contain lace peripherally attached thereto and supported in such a manner as to permit the overlying of the blossoms and to support the same against breakage from their stems and the bouquet.

It is another object of the invention to provide a bouquet holder of funnel-shape having a depending outlet or stem formed or cut into strips similar in diameter to the stems and adapted to be intertangled and entwined with the flower stems so that when they are bound together with the stems by a twine or wire, there is little chance of the bouquet being ejected from the holder.

It is a further object of the invention to provide a plastic bouquet holder in which the periphery of the funnel shaped holder has lace fixed to the same and wherein the flange is in the nature of open bumpers to hold the lace from drooping without any great weight to the holder and to act as a bumper to protect the flowers, the continuous edge of the holder being of thin wall to allow lace to be sewn thereupon with the conventional sewing machine.

It is a further object of the invention to provide a plastic bouquet holder having the above mentioned objects and features which when formed of polyethylene and vinyl plastic may be injection molded and appear to be of pearl color.

Other objects of the invention are to provide a plastic bouquet holder having the above objects in mind, which is of simple construction, inexpensive to manufacture, durable, easy to be assembled with the flowers, of pleasing appearance light in weight, and effective in use.

For a better understanding of the invention reference may be had to the following detailed description taken in connection with the accompanying drawings, in which:

FIG. 6 is a fragmentary vertical sectional view taken on line 6—6 of FIG. 5.

Figure 7:
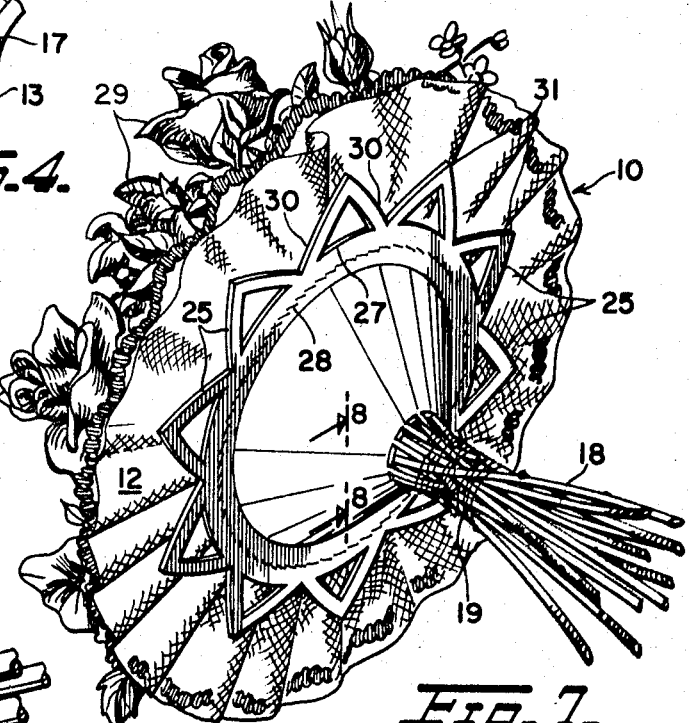
FIG. 7 is an enlarged rear perspective view of the bouquet holder with the flowers assembled therein and the stems extending rearwardly and entangled with the flexible spout runners.
Figure 8:
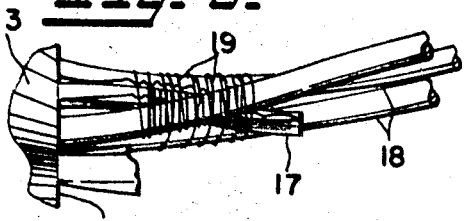
FIG. 8 is an enlarged fragmentary view of the spout runners and stems as viewed in the direction of the arrows 8—8 of FIG. 7.

Referring now to the figures, 10 represents generally a plastic bouquet holder embodying the features of the present invention. This holder is generally of tapered shape including a funnel body 11 with a lace pattern 12 disposed over the front face of the plastic holder and extending upwardly therefrom. The funnel body 11 includes a tapered section 13 open at its small end 15 and at its large end 16. Extending rearwardly from a small end 15 is a series of spout runners or fingers 17 circumferentially spaced from one another and bendable to be entangled and entwined with flower stems 18 in the manner best shown in FIGS. 7 and 8 and wrapped with a wire 19 to hold such flower stems against outward displacement from the bouquet holder and provide a tight grasp upon the flowers, so there is practically no chance of release therefrom.

Figure 1:
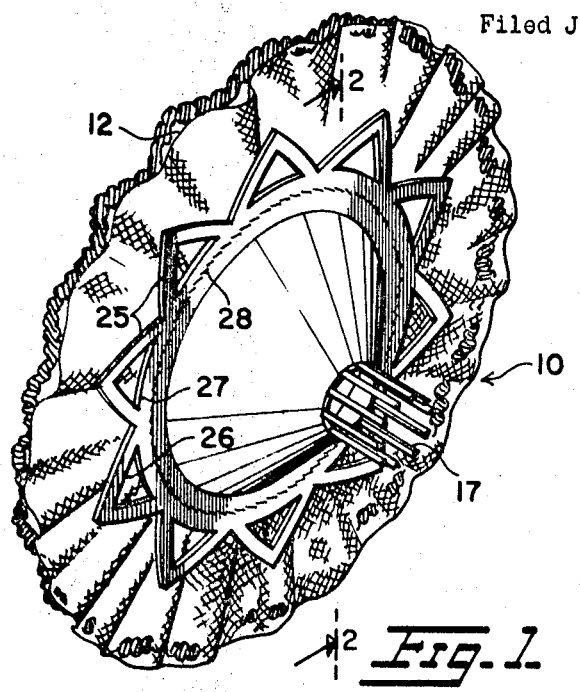
FIG. 1 is a rear perspective view of the plastic bouquet holder with the lace thereon embodying the features of the present invention.
Figure 2:
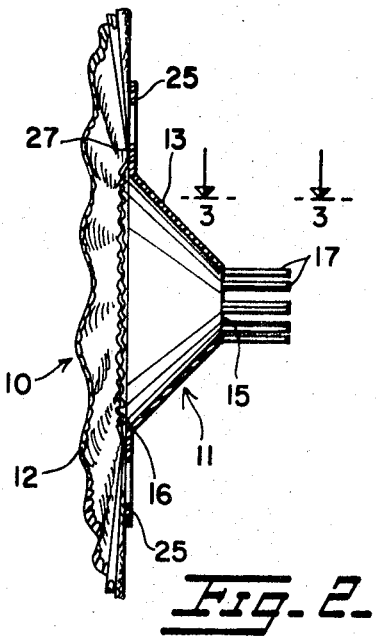
FIG. 2 is a vertical sectional view of the holder as viewed on line 2—2 of FIG. 1.
Figure 3:
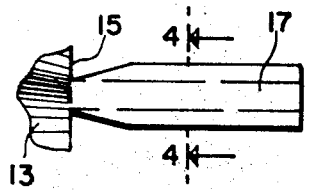
FIG. 3 is an enlarged fragmentary longitudinal view looking in the direction of arrows 3—3 and directed upon the flexible spout runners by which the flower stems are fixed to the holder.
Figure 4:
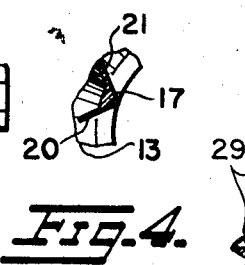
FIG. 4 is a fragmentary transverse sectional view taken on line 4—4 of FIG. 3.
Figure 5:
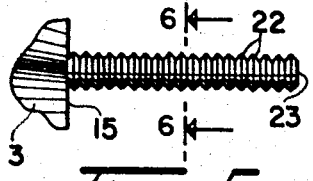
FIG. 5 is a fragmentary view of spout runners modified to have the appearance of threads and designed to have a grip to the sides of the flower stems.

The spout runner 17 to give still further advantage and better grip with the flower stems is provided with thin side flanges 20 and 21 radiating outwardly from the body of the runner 17 as best seen in FIGS. 3 and 4 and substantially ninety degrees apart. These flanges 20 and 21 are thin and can be distorted and provide a soft cushioning connection of the side of the stem with the spout runners. To provide further gripping effect with the stems 18, a spout runner or finger 17 can be shaped as shown in FIGS. 5 and 6 in substantially a threaded shape or contour, resembling threads or series of peripheral ribs 22 so as to engage the sides of the flower stems. Such a runner is indicated generally at 23 and is moldable with the molding of the holder thereof.

This same holder has fashioned upon itself large opening 16, outwardly extending flange formations 25 preferably semi rigid and provided with opening 26 to lighten the weight and at the same time provide a semi rigid support for the lace 12. These flange formations are continuous at the peripheral opening 16 to provide inner flange part 27 to which the lace 12 is stitched as indicated at 28. This lace and the flexible flanges 25 provide a resilient support for blossoms 29 that can lie in and between the spaces 30 between the pointed ends 31 of the flanges 25. Such spacings are converging in shape from the inner part 27 of the flange and outwardly and permit the seating of the undulations or wavy portions of the lace supported over the top faces of the flanges 25. In other words, the lace can be uniformly ruffled over the front face of the bouquet holder and can thereby serve to support the flower blossoms 29 and to keep them spaced in an orderly fashion from one another about the bouquet holder. The flange formations 25 serve not only to hold the lace to keep the same from drooping but to act as bumpers to protect the flowers upon the edge of the holder being engaged by an obstruction.

The entire funnel 11 with the runners or fingers 17 and flanges 25 are formed by molding and the lace 12 is secured to the flange part 27 thereafter by the stitching 28. The holder 11 is made by injection molding of polyethylene or vinyl plastic material. The polyethylene is possibly of a color that gives to the bouquet holder a pearlized color effect. It should be understood that the fingers 17 and 23 can be made of any particular formation but particularly should be serrated or provided with longitudinal fins to give added gripping action upon the stems 18 when entangled or entwined with the stems and secured together in tight gripping relation by the wire 19 wound around the assemblage of the runners or fingers and the flower stems. The overall diameter and the flower effect is expanded or broadened by the use of the lace 12 to support the flower blossoms or heads.

What is claimed is:

1. A plastic bouquet holder of generally funnel shaped section having a small open end and a large open end, spout fingers extending from the small open end and bendable to be entwined with flower stems of flower heads extending through the fingers and wound with attaching wire, a flange extending laterally from the large open end of the funnel shaped member serving to support the flower heads and a lace peripherally attached to the laterally extending flange of the funnel-shaped portion.

2. A plastic bouquet holder as defined in claim 1, said flange being provided with triangular shaped portions spaced from one another and said lace being drooped into the spaces between the triangular shaped portions.

3. A plastic bouquet holder as defined in claim 1, and said fingers having angularly spaced thin side flanges radiating outwardly from the fingers, said flanges being bendable by the flower stems and serving to provide a cushioning connection of the sides of the flower stems with the fingers.

4. A plastic bouquet holder as defined in claim 1, said fingers having a series of ribs extending along the same to improve the gripping effect of the fingers with the flower stems.

References Cited

UNITED STATES PATENTS

| | | | |
|---|---|---|---|
| 3,318,044 | 5/1967 | Kise | 161—27X |
| 2,641,086 | 6/1953 | Shinoda | 161—27X |
| 1,583,505 | 5/1926 | Tilles | 161—30X |

FOREIGN PATENTS

| | | | |
|---|---|---|---|
| 1,157,678 | 12/1957 | France | 47—41 |

PHILIP DIER, Primary Examiner

U.S. Cl. X.R.

47—41, 55; 248—27.8